United States Patent [19]

Fish et al.

[11] Patent Number: 6,057,981
[45] Date of Patent: May 2, 2000

[54] PRODUCT INFORMATION IDENTIFICATION IN A HEAD DISC ASSEMBLY

[75] Inventors: Wilson Massey Fish, Yukon; David Christopher Pruett, Oklahoma City, both of Okla.

[73] Assignee: Seagate Technology, Inc., Scotts Valley, Calif.

[21] Appl. No.: 08/995,567

[22] Filed: Dec. 22, 1997

Related U.S. Application Data

[60] Provisional application No. 60/059,760, Sep. 23, 1997.

[51] Int. Cl.[7] .............................. G11B 5/86; G11B 33/12
[52] U.S. Cl. ..................... 360/97.01; 360/106; 360/108
[58] Field of Search ................................. 360/97.01, 106, 360/108

[56] References Cited

U.S. PATENT DOCUMENTS

| | | | |
|---|---|---|---|
| 5,262,907 | 11/1993 | Duffy et al. | 360/77.05 |
| 5,276,558 | 1/1994 | Hanson | 360/98.06 |
| 5,276,662 | 1/1994 | Shaver et al. | 369/32 |
| 5,282,099 | 1/1994 | Kawagoe et al. | 360/97.01 |
| 5,375,243 | 12/1994 | Parzych et al. | 395/725 |
| 5,465,240 | 11/1995 | Mankovitz | 360/72.2 |
| 5,572,659 | 11/1996 | Iwasa et al. | 395/182.04 |
| 5,608,910 | 3/1997 | Shimakura | 395/670 |
| 5,631,999 | 5/1997 | Dinsmore | 388/805 |
| 5,732,237 | 3/1998 | Ikeda | 395/439 |
| 5,751,672 | 5/1998 | Yankowski | 369/30 |

FOREIGN PATENT DOCUMENTS 6-295238  10/1994  Japan.

OTHER PUBLICATIONS

Data Sheet for Serial EEPROM, 1996 Microchip Technology Inc. 24AA00/24LC00/24C00; pp. 1–12.

*Primary Examiner*—Craig A. Renner
*Attorney, Agent, or Firm*—Crowe & Dunlevy

[57] ABSTRACT

An apparatus for improving the operational performance of a disc drive through the identification of vital product information associated with a head-disc assembly (HDA) of the disc drive. The disc drive comprises a printed wiring assembly (PWA) housing control circuitry for the disc drive. The HDA of the disc drive is operably coupled to the printed wiring assembly and includes a rotatable disc to which data are written by a controllably positionable head. A non-volatile memory device is mounted on the HDA and operably coupled to the PWA so that, when the disc drive is initialized, the PWA verifies the configuration of the HDA before proceeding with the initialization of the disc drive, thereby preventing errors and damage to the disc drive as a result of the installation of a new, replacement PWA in the disc drive, or the downloading of new, incorrect firmware to the PWA.

6 Claims, 3 Drawing Sheets

PRODUCT INFORMATION IDENTIFICATION IN A HEAD DISC ASSEMBLY

RELATED APPLICATIONS

This application claims the benefit of U.S. Provisional Application No. 60/059,760 entitled METHOD FOR RETRIEVING VITAL PRODUCT INFORMATION FROM NON-ACCESSIBLE MEDIA DEVICE, filed Sep. 23, 1997.

FIELD OF THE INVENTION

The present invention relates generally to the field of disc drive devices and more particularly, but without limitation, to improving the operational performance of a disc drive through the identification of vital product information associated with a head disc assembly (HDA) of the disc drive.

BACKGROUND

Disc drives are used as primary data storage devices in modern computers and computer networks. A typical disc drive includes a head-disc assembly (HDA) housing five to ten magnetic discs which are rotated by a spindle motor at a constant high speed and accessed by an array of read/write heads which store data on tracks defined on the disc surfaces. Electronics used to control the operation of the HDA are provided on a printed wiring assembly (also referred to as a "circuit board" or "card") which is mounted to the underside of the HDA.

Technological advancements in the art have resulted in continued improvements in disc drive data storage capacities. It has not been at all uncommon for each successive generation of drives to provide substantially twice the data storage capacity as the previous generation, at an equal or better data transfer rate. Design cycle times are also being shrunk to the point that a new generation of drives is typically introduced into the marketplace every few months.

To meet the tremendous technical and logistical challenges of remaining competitive in the present market, disc drive manufacturers have taken steps to design and release new disc drive products as fast and efficiently as possible. Of particular interest is component standardization, which involves the standardization of disc drive designs so that a wide variety of disc drive products from a single product family can be provided with the same or similar hardware components. The performance of each individual drive is then optimized during manufacturing through the selection of parameter values (such as write current, gain, filter characteristics, etc.) which are subsequently loaded and used by the drive during operation.

As modern disc drives typically employ firmware to provide programming for disc drive controllers (such as microprocessors and digital signal processors), manufacturers further commonly load substantially the same firmware on all of the drives in the same disc drive product family. The firmware relies upon additionally stored information indicative of the particular configuration of the drive (such as the number of discs, the data storage capacity, the type of interface, etc.) to access particular routines suitable for each particular disc drive configuration, and loads the parameters established during manufacturing to optimize the performance of the drive.

A typical disc drive includes one or more non-volatile memory devices (i.e., memory devices that retain their contents when external power is removed from the drive) to which the firmware is written. The parameter values and product information are also written to such devices during the manufacture of the drive. The devices are located on the disc drive printed wiring assembly (PWA) and are accessed during each initialization of the drive.

A problem can thus arise when an originally installed PWA is removed from a disc drive and replaced with a new, replacement PWA. Such replacements commonly occur during manufacturing and field service operations in response to, for example, the detection of a failure condition associated with the originally installed PWA. Unless steps are explicitly taken to ensure that the parameter values and product information associated with the HDA are transferred from the originally installed PWA to the new, replacement PWA, an error condition may result when the disc drive is reinitialized using the new PWA. Particularly, the firmware stored on the new PWA may expect to see a different hardware configuration than that which the HDA actually possesses, or the parameter values stored on the new PWA may be inappropriate for reliable operation of the drive.

Such mismatches in parameters and product information can result in unacceptable delays as a disc drive with a newly installed replacement PWA attempts to reinitialize. Moreover, when such mismatches in parameters and product information are sufficiently pronounced, the disc drive can be physically damaged when the drive attempts to spin-up and load the heads (i.e., operationally move the heads out over the disc surfaces). Although the optimal parameter values for an HDA are also typically stored on designated tracks of the HDA, such tracks cannot be accessed until after the disc drive has already successfully spun-up and loaded the heads.

Even when no replacement of the PWA occurs, problems can still arise when new, updated firmware is downloaded to the PWA, if the new firmware is incorrectly suited to the configuration of the HDA. Such firmware updates are often performed during field service operations, and although precautions are taken to ensure the correct firmware is downloaded, errors still occasionally occur. As will be recognized, a firmware-hardware mismatch can also result in the same types of problems that occur when an incorrectly configured PWA is installed.

Accordingly, there is a need for a way to readily indicate the product information associated with the HDA of a disc drive so as to eliminate problems when a new, replacement PWA is installed in the drive, or when new firmware is downloaded to the PWA.

SUMMARY OF THE INVENTION

The present invention is directed to an apparatus for improving the operational performance of a disc drive through the identification of vital product information associated with a head-disc assembly of the disc drive.

In accordance with a preferred embodiment of the present invention, the disc drive is provided with a printed wiring assembly housing control circuitry for the disc drive. The head-disc assembly of the disc drive is operably coupled to the printed wiring assembly and includes a rotatable disc to which data are written by a controllably positionable head.

A non-volatile memory device is mounted on the HDA and operably coupled to the PWA so that, when the disc drive is initialized, the PWA verifies the configuration of the HDA before proceeding with the initialization of the disc drive, thereby preventing errors and damage to the disc drive as a result of the installation of a new, replacement PWA in the disc drive, or the downloading of new, updated firmware to the PWA.

These and various other features as well as advantages which characterize the present invention will be apparent from a reading of the following detailed description and a review of the associated drawings.

DETAILED DESCRIPTION

Figure 1:
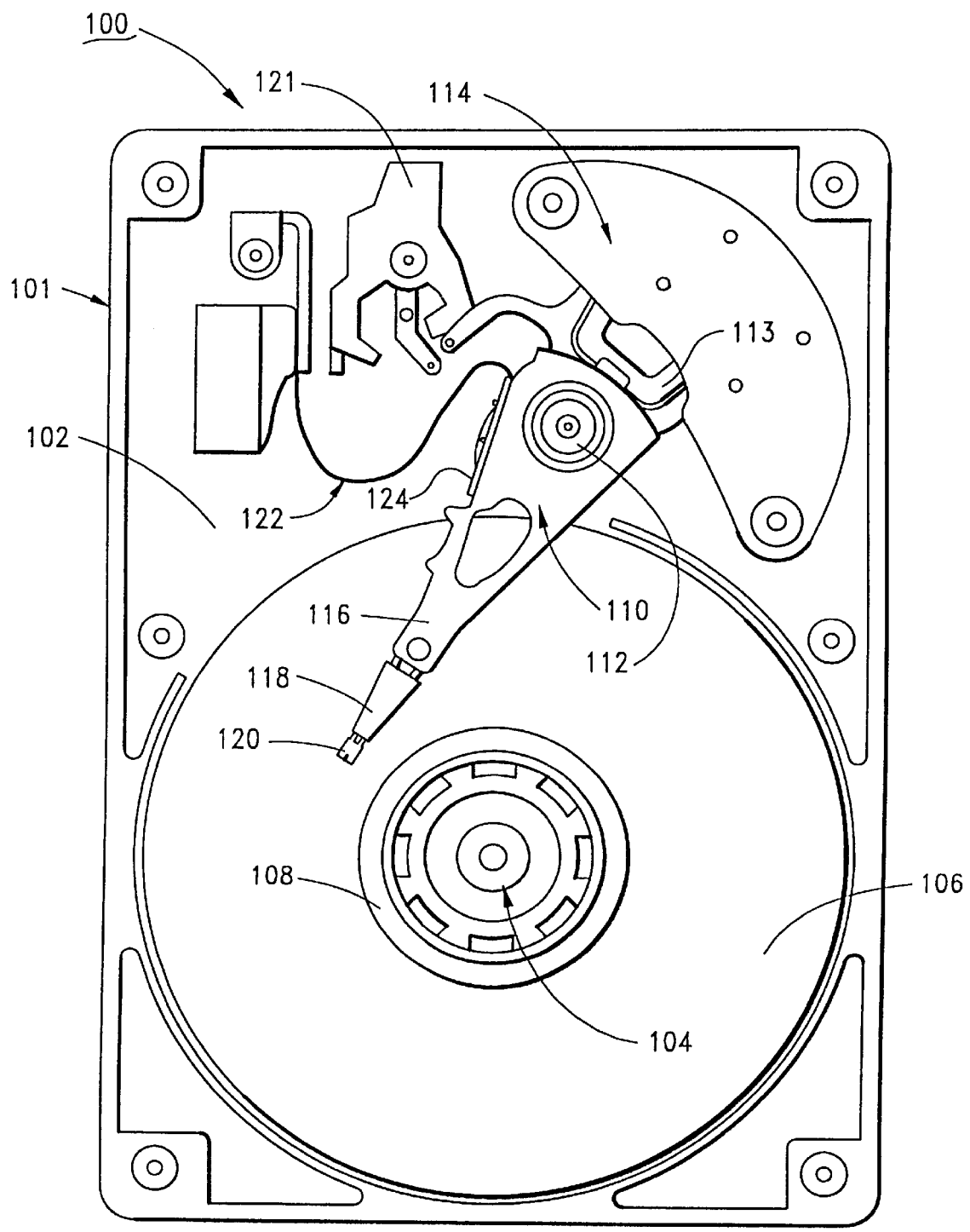
FIG. 1 provides a top plan view of a head-disc assembly (HDA) of a disc drive constructed in accordance with a preferred embodiment of the present invention.

Referring now to FIG. 1, shown therein is a top plan view of a disc drive 100 constructed in accordance with a preferred embodiment of the present invention.

The disc drive 100 includes a head-disc assembly (HDA) 101 and a disc drive printed wiring assembly (PWA) which is mounted to the underside of the HDA 101 to complete the disc drive 100. Although not shown in FIG. 1, the PWA provides control circuitry necessary to control the operation of the HDA 101 and to transfer data between the HDA 101 and a host computer in which the disc drive 100 can be mounted.

As shown in FIG. 1, the HDA 101 includes a base casting 102 which supports various components of interest and cooperates with a top cover (which has been omitted from FIG. 1) to form an internal, sealed environment for the disc drive 100. Mounted to the base casting 102 is a spindle motor 104 to which five magnetic discs 106 (only the top one of which is visible) are axially mounted for rotation at a constant high speed. A disc clamp 108 secures the discs 106 to the spindle motor 104.

A rotary actuator assembly 110 is mounted to the base casting 102 for rotation about a cartridge bearing assembly 112 in response to currents applied to a coil 113 of a voice coil motor (VCM) 114. The actuator assembly includes a plurality of rigid arms 116 which extend into the stack of discs 106 as shown, with each of the rigid arms 116 having an associated flexible suspension assembly 118 extending therefrom.

Heads 120 are affixed to each of the suspension assemblies 118. The heads 120 include read and write elements which magnetically interact with the disc recording surfaces. The heads 120 are further provided with slider assemblies which support the heads 120 upon air bearings established by wind currents set up by the high speed rotation of the discs 106.

A latch assembly 121 secures the actuator assembly 110 in a park position when the disc drive 100 is non-operational, and a flex assembly (generally denoted at 122) is provided to enable the heads 120 and the coil 113 to electrically communicate with the disc drive PWA.

Figure 2:
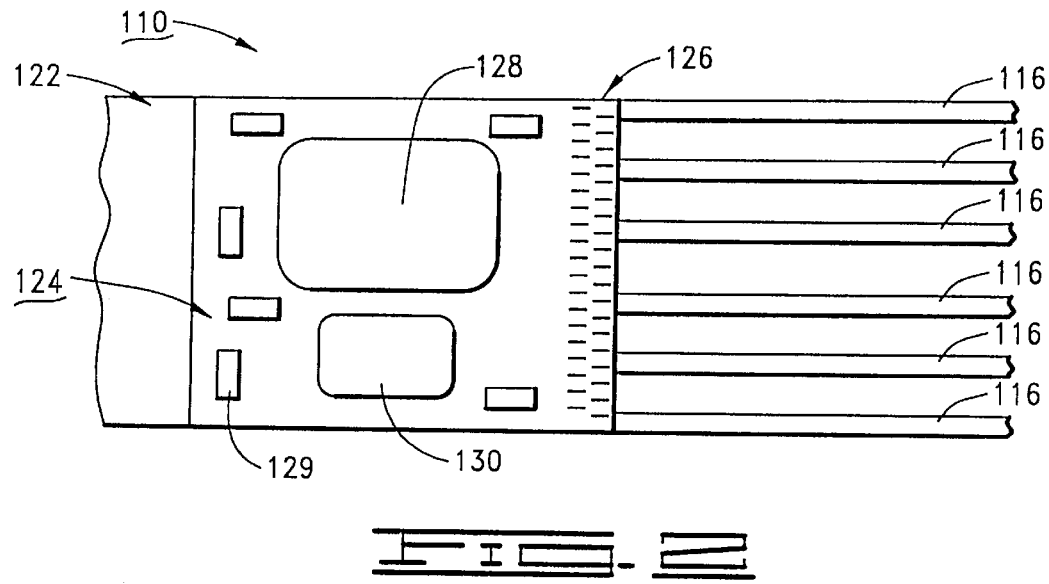
FIG. 2 provides a side, elevational view of a portion of an actuator assembly of the HDA of FIG. 1, showing an electrically erasable, electrically programmable read-only memory (EEPROM) used to store product information associated with the HDA.

Of particular interest is a flex circuit board 124 of the flex assembly 122, which is mounted to the side of the actuator assembly 110 as shown. FIG. 2 provides a side, elevational view of a portion of the actuator assembly 110 and shows the flex circuit board 124 in greater detail. For purposes of clarity, head wires have been omitted from FIG. 2, but it will be understood that such wires are routed along each of the actuator arms 116 and terminate at pads 126 to which the head wires are soldered. Also for purposes of clarity, the discs 106 of FIG. 1 are not shown in FIG. 2, although it will be understood that the actuator arms 116 extend into the stack of discs 106 in a manner as previously depicted in FIG. 1.

The flex circuit board 124 includes a conventional preamp circuit 128 which operates to transfer data to and from the discs 106 by generating write currents that are passed (by way of the head wires) through the heads 120 during a write operation and detecting and amplifying read signals established by the heads 120 during a read operation. An example of a suitable preamp circuit is a VM61312 Magneto-Resistive Head Read/Write Preamplifier from VTC Inc., of Bloomington, Minn., U.S.A. Conventional discrete components such as capacitors and resistors (one such component being identified at 129) are also provided on the flex circuit board 124 to provide filtering and capacitive decoupling as required.

Continuing with FIG. 2, the flex circuit board 124 is further shown to include a non-volatile memory device 130, hereinafter referred to as an electrically erasable, electrically programmable read-only memory, or EEPROM. As explained below, the EEPROM 130 electronically stores product information associated with the HDA 101 and is accessed by the disc drive PWA during the initialization of the disc drive 100. An example of a suitable EEPROM is a 24AA00 serial EEPROM from Microchip Technology, Inc., of Chandler, Ariz., U.S.A., which comes in a five pin package and stores 16 bytes of data.

For reference, both the preamp circuit 128 and the EEPROM 130 have been shown in FIG. 2 as encapsulated in epoxy in a manner conventional in the art, in order to improve the operational characteristics of the flex circuit board 124. A suitable epoxy is part no. 4401 or 4451 (dam) and part no. 4450 (filler) supplied by Hysol, Inc. Further, although the flex circuit board 124 is a particularly suitable location for the EEPROM 130, the present invention is not so limited; that is, the product information can be electronically stored elsewhere on the HDA 101, as desired.

Figure 3:
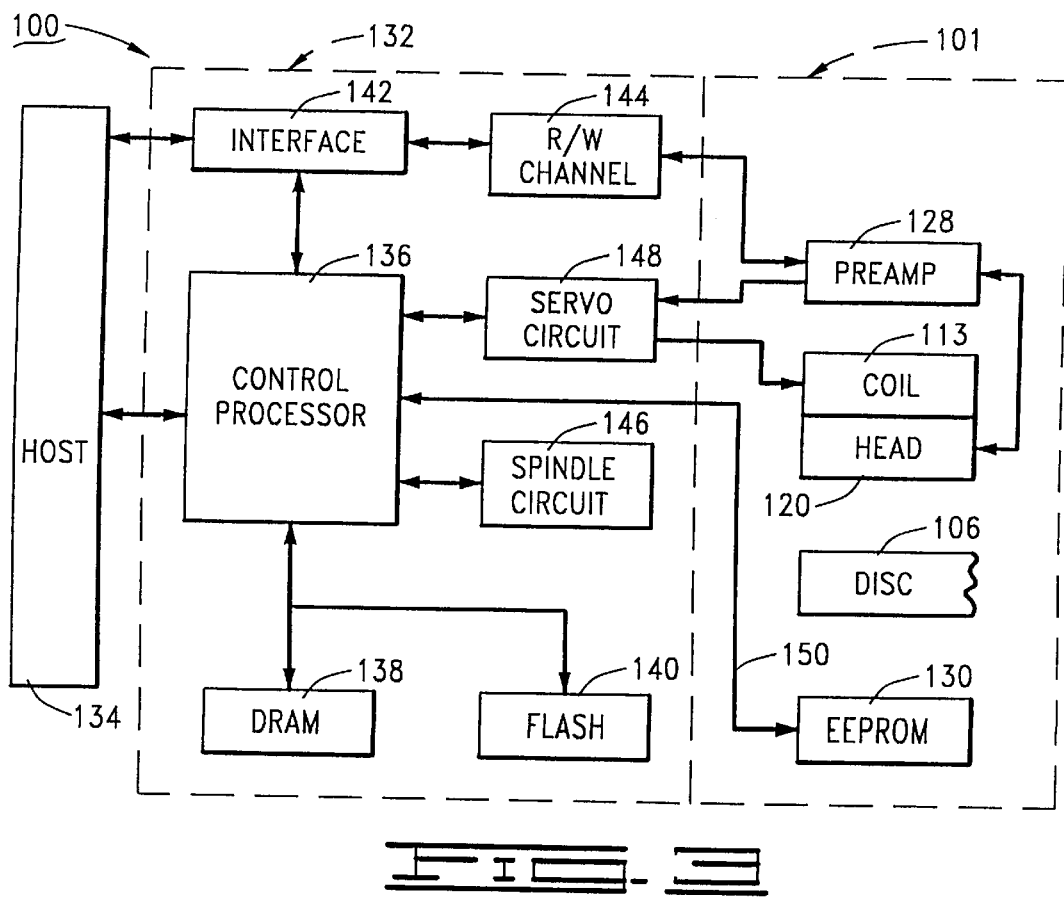
FIG. 3 provides a functional block diagram of the disc drive of FIG. 1 operably mounted in a host computer, the diagram of FIG. 3 including portions of the HDA of FIG. 1 and electronic circuits associated with a printed wiring assembly (PWA) of the disc drive which is not separately shown in the drawings, but mounted to the underside of the HDA in a manner well known in the art.

Before discussing the operation of the EEPROM 130 in greater detail, it will be helpful to first review the main functional components of the disc drive 100 and FIG. 3 has been provided for this purpose. Referring now to FIG. 3, shown therein is a functional block diagram of the disc drive 100 of FIG. 1, including representations of the HDA (indicated by dotted line enclosure 101) and the disc drive PWA (indicated by dotted line enclosure 132).

A host computer 134, in which the disc drive 100 is contemplated as being mounted, provides top level control of a disc drive control processor 136, which in turn controls the operation of the disc drive 100 in accordance with programming and parameter values stored in dynamic random access memory (DRAM) 138 and non-volatile flash memory 140.

Data to be stored by the disc drive 100 are transferred from the host computer 134 to an interface circuit 142, which includes a data buffer for temporarily buffering the data and a sequencer for directing the operation of a read/write channel 144 and the preamp circuit 128 during data transfer operations. A spindle circuit 146 is provided to control the rotation of the discs 106.

A servo circuit 148 is provided to control the position of the head 120 relative to the disc 106 as part of a servo loop established by the head 120, the preamp circuit 128, the servo circuit 148 and the coil 113. The servo circuit 148 includes a digital signal processor (DSP) which is programmed to carry out two main types of servo operation: seeking, which involves the movement of the head 120 from an initial track to a destination track on the disc 106, and track following, which involves the continued positioning of the head 120 over a selected track on the disc 106. The general construction and operation of such circuits are well known and discussed, for example, in U.S. Pat. No. 5,276,662 issued Jan. 4, 1994 to Shaver et al., U.S. Pat. No. 5,631,999 issued May 20, 1997 to Dinsmore and U.S. Pat. No. 5,262,907 issued Nov. 16, 1993 to Duffy et al., each of which is assigned to the assignee of the present invention.

As is conventional, during manufacturing of the disc drive 100 various parameter values are optimized and stored in the flash memory 140 for subsequent use by the disc drive 100 during operation. Examples of typical parameter values that can be optimized include write current magnitude, prewrite compensation, servo gain, data and servo level detection thresholds, transversal equalizer tap weights, adaptive filtering settings and, in disc drives employing magneto-resistive (MR) heads, read bias current. Such parameters are well known and have been listed for purposes of illustration, not limitation. In addition to being stored in the flash memory 140, the disc drive 100 further stores these parameter values in selected service tracks on the discs 106 disposed outside the recording bands of tracks used to store user data. As is conventional, during initialization of the disc drive 100 the parameters are transferred from the flash memory 140 to various circuits of the PWA 132, such as the read/write channel 144 and the servo circuit 148, to enable these circuits to operate at an optimal level during normal operation of the disc drive 100.

Additionally, during manufacturing various product information values are stored in the EEPROM 130 by the control processor 136, which communicates with the EEPROM 130 by way of a standard serial bus (identified at 150 in FIG. 3). In a preferred embodiment, the product information is stored in the EEPROM 130 as shown in Table I.

TABLE I

| Bytes | Product Information |
|---|---|
| 0 | Product Family |
| 1 | Product Family Member |
| 2–9 | World Wide Name |
| 10–13 | HDA Serial Number |
| 14–15 | Reserved |

With reference to Table I., Product Family is a single byte value which identifies a particular product family, which is defined as an overall group of disc drive products that use nominally identical PWAs, firmware, and major interface configurations, but have varying HDA configurations. Product Family Member, a single byte value, identifies the particular model type from the product family, distinguished by a particular configuration for the HDA 101 (such as drive height, data capacity, number of discs, etc.).

World Wide Name, an eight byte value, is a unique identifier for the disc drive 100. As will be recognized by those skilled in the art, the World Wide Name is part of a Fibre Channel convention which allows network servers to uniquely identify each particular drive on a global network, no matter where the drive is physically located in the world. Accordingly, each Fibre Channel compatible drive is assigned its own, unique World Wide Name.

HDA Serial Number is a four byte value used internally by the disc drive manufacturer as a unique identifier for each HDA 101. The HDA Serial Number (S/N) distinguishes the HDA 101 from other nominally identical HDAs during the manufacturing process and also serves to indicate the Product Family Member of which the HDA 101 is a part. Finally, the last two bytes (bytes 14 and 15) are not used and are therefore reserved for future use. It will be readily understood that the product information of Table I. has been disclosed for purposes of illustration and is not limiting; that is, other types of electronically stored product information can readily be used in the practice of the present invention, so long as the information serves to at least identify the configuration of the HDA 101.

It is therefore contemplated that during the manufacture of the disc drive 100, parameter values that optimize the operational performance of the disc drive 100 are selected and stored both in the flash memory 140 (FIG. 3) and on the aforementioned service tracks of the discs 106. At an appropriate point during the manufacturing process, the control processor 136 further writes the product information of Table I. associated with the disc drive 100 to the EEPROM 130 and to the flash memory 140. Thereafter, the disc drive 100 accesses the product information from the EEPROM 130 during drive initialization, in a manner that will now be discussed.

Figure 4:
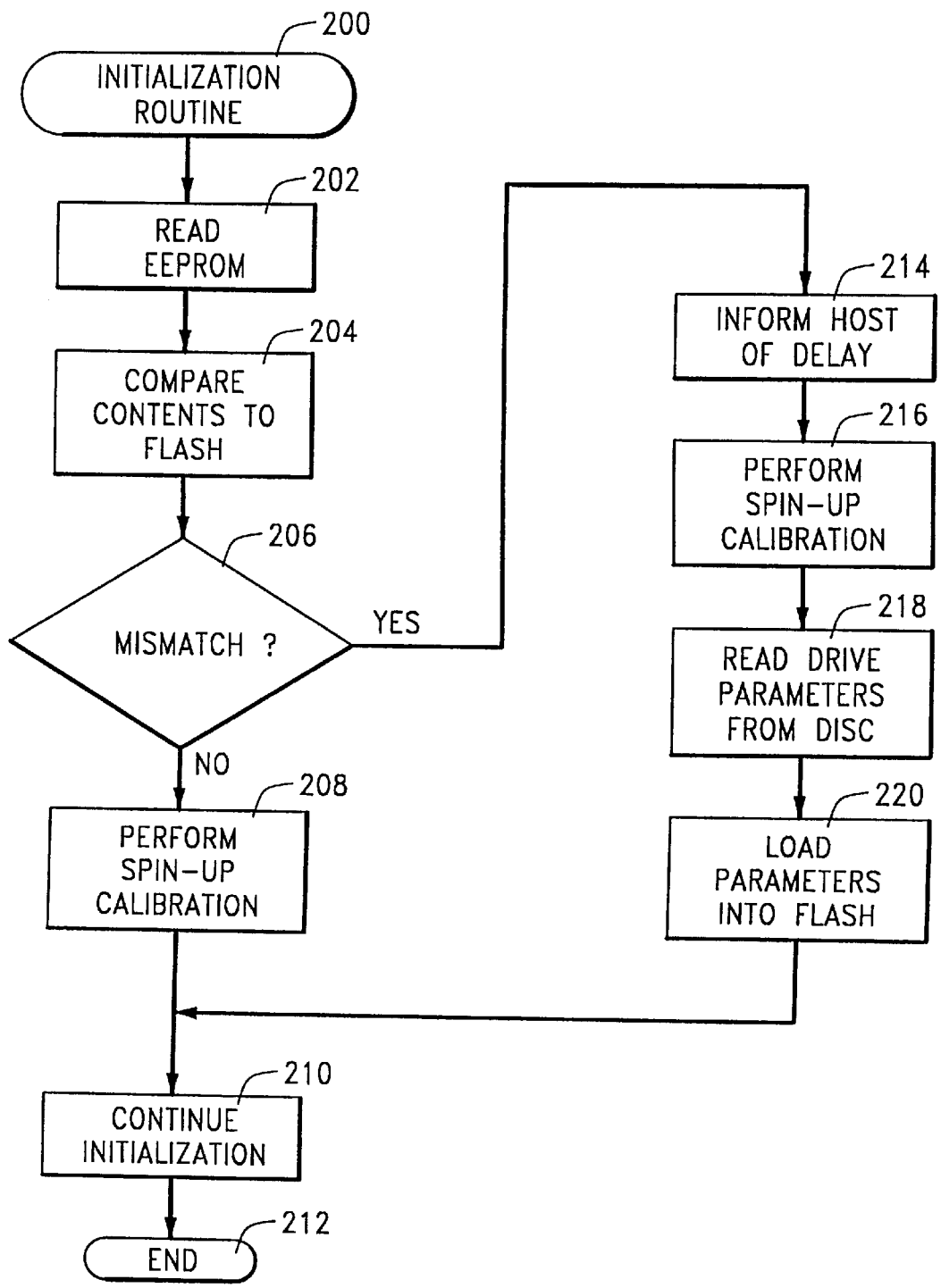
FIG. 4 provides a flow chart for an INITIALIZATION routine carried out each time the disc drive is initialized, the routine representative of programming stored in memory and utilized by a control processor located on the disc drive PWA.

Referring to FIG. 4, shown therein is a generalized flow chart for an INITIALIZATION routine 200, contemplated as representative of programming stored in the flash memory 140 and utilized by the control processor 136 during initialization of the disc drive 100 such as, for example, when the disc drive 100 is turned on after being in a non-operational state.

As shown by block 202, the control processor 136 first operates to download the contents of the EEPROM 130 into the DRAM 138. The control processor 136 next compares the product information from the EEPROM 130 to the product information that was previously stored in the flash memory 140, as indicated by block 204. As discussed above, when the originally installed PWA 132 remains part of the disc drive 100 (i.e., no PWA replacement or firmware download have taken place), the product information from both the EEPROM 130 (on the HDA 101) and the flash memory 140 (on the PWA 132) should match, indicating that all is well and initialization can proceed in a normal fashion. Such operation is indicated by decision block 206, which when no mismatch is detected, the flow proceeds to block 208 wherein a conventional spin-up calibration operation is performed. As will be recognized by those skilled in the art, during the spin-up calibration the disc drive 100 initiates rotation of the discs 106 up to operational speed and performs certain fine adjustments to the servo circuit 148 in order to optimize the operation of the disc drive 100 in view of existing environmental conditions. The heads 120 are moved out over the surfaces of the discs 106 and the disc drive 100 continues its conventional initialization steps, block 210, at the conclusion of which the INITIALIZATION routine ends at 212 and the disc drive 100 notifies the host computer 134 (FIG. 3) that the drive is ready for normal operation.

However, when the PWA 132 has been replaced so that the HDA 101 is provided with a new, replacement PWA, as discussed above the parameter values stored in the flash memory 140 of the new PWA (which will also be identified herein as 132) may not necessarily reflect values that will optimize drive performance. Moreover, if the firmware of the new PWA 132 expects a different hardware configuration than that of the HDA 101, undesirable delays and/or damage can result to the disc drive 100.

Accordingly, in such case, decision block 206 will detect a mismatch between the product information electronically stored in the EEPROM 130 on the HDA 101 and the product information electronically stored in the flash memory 140 on the PWA 132. The flow of FIG. 4 will thus pass from decision block 206 to block 214, wherein the control processor 136 informs the host computer 134 to expect a delay as the disc drive 100 proceeds to compensate for the mismatch. The operation of block 214 is particularly useful when the disc drive 100 is incorporated into a computer network, as the host computer 134 may have a predetermined timeframe in which it expects the disc drive 100 to complete initialization and be ready for normal operation. Thus, the flow of FIG. 4 serves to prevent errors declared by the host computer 134 when the disc drive 100 fails to initialize within such a timeframe. For reference, the notification to the host may be made transparent to a user of the host computer 134, or alternatively, a user-readable message displayed on a monitor of the host computer 134 can be generated.

Once the host computer 134 has been notified to expect a delay, the disc drive 100 next performs a spin-up calibration at block 216 which is similar to that as previously discussed for block 208. It is contemplated that the spin-up calibration of block 216 will likely take longer than that of block 208, should the control processor 136 have to adjust the configuration of the firmware to an arrangement suitable for the actual hardware configuration of the HDA 101 (as reflected by the product information from the EEPROM 130) and to otherwise perform calibration operations necessary to enable safe loading of the heads 120 over the discs 106.

Because the parameter values necessary to optimize operation of the HDA 101 are stored on the service tracks of the HDA 101, these parameters are next downloaded and stored in the flash memory 140, as indicated by blocks 218 and 220. As will be recognized, it may be necessary to transfer the parameter values from the discs 106 to the host computer 134 and then use the host computer 134 to write the parameter values to the flash memory 140. Such operation can also be made transparent to the user of the host computer 134, or can be made to require user intervention. It will be recognized that such routines are presently used by disc drive manufacturers to initially write the parameter values to the flash memory 140 during original disc drive manufacturing and so are well within the ability of those skilled in the art to implement. It may be desirable at this time to further update the flash memory 140 with the product information retrieved from the EEPROM 130, so as to eliminate future mismatch conditions when the disc drive 100 is subsequently initialized.

Finally, once the appropriate parameter values for the HDA 101 have been transferred to the flash memory 140, the routine of FIG. 4 continues as before to complete initialization of the disc drive 100, block 210, after which the routine ends at block 212 and the drive is ready for normal operation.

It will now be clear that the present invention provides significant advantages in that the product information associated with the HDA 101 is at all times electronically stored in the HDA 101 and accessed each time that the disc drive 100 is initialized. Accordingly, PWAs 132 can be readily swapped during manufacturing or in the field without risking host timeout errors or damage to the drive.

Although for purposes of disclosing a preferred embodiment the EEPROM 130 has been presented herein, it will be recognized that other types of non-volatile memory devices can be readily used in the practice of the present invention. Moreover, although the flex circuit board 124 is a preferred location for the non-volatile memory device because the serial bus (150 in FIG. 3) can be incorporated into the existing flex ribbon of the flex circuit assembly 122, other locations on the HDA 101 may be selected as desired. Particularly, any location (whether interior to or exterior to the HDA 101) can be selected, as long as the non-volatile memory device remains associated with the HDA 101 should the associated PWA 132 of the disc drive 100 be removed from the HDA 101, and as long as the non-volatile memory device is electrically accessible by the PWA 132 during initialization of the disc drive 100.

In view of the foregoing, it will be understood that the present invention is directed to an apparatus for improving the operational performance of a disc drive (such as 100) through the identification of vital product information associated with a head-disc assembly (such as 101) of the disc drive. The disc drive comprises a printed wiring assembly (such as 132) housing control circuitry for the disc drive. The head-disc assembly is operably coupled to the printed wiring assembly and includes a rotatable disc (such as 106) to which data are written by a controllably positionable head (such as 120).

A non-volatile memory device (such as 130) is mounted on the HDA and operably coupled to the PWA so that, when the disc drive is initialized, the PWA verifies the configuration of the HDA before proceeding with the initialization of the disc drive, thereby preventing errors and damage to the disc drive as a result of the installation of a new, replacement PWA in the disc drive or the installation of new, incorrect firmware.

For the purposes of the appended claims, it will be understood that the terms "circuit" and "circuitry" will be broadly understood as consistently used hereinabove to cover both hardware and firmware types of electronic configurations. The phrase "head-disc assembly" will be understood to cover mechanical aspects of a disc drive without the control circuitry of an externally mounted, removable printed wiring assembly. The phrase "product information" will be understood as consistently used hereinabove to describe information that serves to at least identify the configuration of a particular HDA. The phrase "electronically stored" will be understood as consistently used hereinabove to relate to a storage configuration that is readable by a computer or similar circuit and will not be extended to cover a non-electronic form of storage, such as storage in a human-readable or optical machine-readable (i.e., barcode scanner) form, such as with adhesive labels that are applied to the exterior surface an HDA.

It will be further understood that various claim steps have been identified using numbering and lettering solely as an aid in readability and understanding, so that such identification will not limit the claims to the particular ordering of the steps shown.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A head-disc assembly having an enclosure housing with an external surface thereof mateable with a printed wiring assembly to for a disc drive, the head-disc assembly comprising:

a non-volatile integrated circuit memory device affixed within the enclosure housing of the head-disc assembly in which product information associated with the head-disc assembly is electronically stored, wherein the printed wiring assembly subsequently accesses the product information when the printed wiring assembly is mated with the head-disc assembly.

2. The head-disc assembly of claim 1, wherein the non-volatile integrated circuit memory device comprises an electrically erasable, electronically programmable read-only memory device.

3. The head-disc assembly of claim 1, further comprising:

a rotatable disc; and an actuator assembly adjacent the disc, comprising:
a head which transfers data to the disc; and
a flex circuit assembly operably coupled to the head, wherein the non-volatile integrated circuit memory device is affixed to the flex circuit assembly.

4. A disc drive, comprising:

a printed wiring assembly having control circuitry for the disc drive; and a head-disc assembly, operably coupled to the printed wiring assembly, comprising:

a housing;

a rotatable disc supported for rotation within the housing; and an actuator assembly adjacent the disc and disposed within the housing, comprising:
a head which transfers data to the disc;
a flex circuit assembly operably coupled to the head and to the printed wiring assembly; and
a non-volatile integrated circuit memory device, affixed to the flex circuit assembly, which electronically stores product information associated with the head-disc assembly, where the product information is accessed by the printed wiring assembly.

5. The disc drive of claim 4, wherein the non-volatile integrated circuit memory device is operably coupled to the flex circuit assembly.

6. The disc drive of claim 4, wherein the non-volatile integrated circuit memory device comprises an electrically erasable, electronically programmable read-only memory device.

* * * * *